United States Patent [19]

Ashikaga et al.

[11] Patent Number: 4,617,675
[45] Date of Patent: Oct. 14, 1986

[54] DIGITAL PWMED PULSE GENERATOR

[75] Inventors: Tadashi Ashikaga; Yoshihide Kamanaka, both of Tokyo; Keiko Fushimi, Yokohama, all of Japan

[73] Assignee: Kabushiki Kaisha Meidensha, Japan

[21] Appl. No.: 709,580

[22] Filed: Mar. 8, 1985

[30] Foreign Application Priority Data

Mar. 8, 1984 [JP] Japan .................................. 59-44380
Mar. 8, 1984 [JP] Japan .................................. 59-44382

[51] Int. Cl.$^4$ .................... H03K 7/08; H02M 7/217; H02P 5/06
[52] U.S. Cl. ................................ 375/22; 332/9 R; 318/345 E; 363/41
[58] Field of Search .................. 375/22; 307/265; 328/14, 28; 330/207 A; 332/9 R, 9 T; 364/718, 721; 370/9; 318/345 R, 345 E, 301, 311, 599; 363/41; 340/870.24, 825.63

[56] References Cited

U.S. PATENT DOCUMENTS

| 4,371,819 | 2/1983 | Kaufmann | 318/345 E |
| 4,459,534 | 7/1984 | Nayase et al. | 318/582 |
| 4,502,024 | 2/1985 | Nishikawa et al. | 375/22 |
| 4,562,524 | 12/1985 | Mutoh et al. | 363/41 |

FOREIGN PATENT DOCUMENTS 3220204 9/1983 Fed. Rep. of Germany.

OTHER PUBLICATIONS

IEEE Proceedings-Part B, vol. 128, No. 6, Nov. 1981-"Microprocessor Control of PWM Inverters" pp. 293-305.
IEEE Proceedings on Industrial Electronics, vol. 1E-29, No. 1, Feb. 1982, "Microprocessor Based Sinusoidal PWM Inverter by DMA Transfer pp. 46-51.
Siemens-Zeitschrift, vol. 45, No. 10, 1971 pp. 761-764.
Regelgungstechnik, vol. 27, No. 12, Dec. 1979 pp. 379-386.
Siemens-Forsch-U. Entwicklbericht, vol. 1, No. 1, 1972 pp. 184-193.

Primary Examiner—Benedict V. Safourek
Attorney, Agent, or Firm—McGlew and Tuttle

[57] ABSTRACT

Plural series of digital pattern data are determined by PWMing a sine wave by a triangular wave and further classified into each series by the number of triangles included within a half cycle of the sine wave. An appropriate series of data are selected according to a frequency command. The selected data are further adjusted in response to a voltage control command. On the basis of the selected and adjusted pattern data and in response to a half period signal of triangular wave and triangle slope signals, a PWMed pulse is generated through a logical circuit. In the case where the generator is incorporated with an induction motor driving system, it is possible to control speed (frequency), torque (voltage), rotational directions, and torque fluctuations (phase difference) of an induction motor accurately at high response speed.

9 Claims, 12 Drawing Figures

DIGITAL PWMED PULSE GENERATOR

BACKGROUND OF THE INVENTION

1. Field of the Invention

The present invention relates generally to a digital pulse-width-modulated pulse generator and more specifically to the pulse generator for generating a PWMed pulse signal synchronizing with a sine wave by PWMing a sine wave signal in dependence upon a triangular wave signal in digital fashion. Further, the digital PWMed pulse generator according to the present invention is advantageously incorporated with a decoupled-vector control induction motor driving system by way of typical example.

2. Description of the Prior Art

Conventionally, an analog PWMed pulse generator has generally been used for generating a PWMed pulse synchronizing with a sine wave. In the prior-art pulse generator, however, since the amplitude of a sine wave signal is compared with that of a triangular wave signal in analog fashion by a comparator, whenever ambient temperature varies, the amplitudes of both the signals change and further an offset voltage of the comparator inevitably fluctuates. Therefore, it is impossible to generate an accurate PWMed signal. In particular, where the voltage and the frequency of the PWMed pulse is small, it is very difficult to generate a PWMed signal accurately. Of course, it may be possible to eliminate the harmful influence of variation in ambient temperature upon the generator in some way. However, the generator may be increased in size, cost, the number of elements, etc.

On the other hand, the method of driving an induction motor has been highly developed owing to a remarkable progress in power electronic device technology. Especially, the vector control method has been proposed for driving an induction motor at variable speeds under quick response characteristics equivalent to a DC machine. In this vector control method, the primary current of an induction motor is divided into a primary exciting current to generate the secondary magnetic flux and a primary driving current to generate the secondary driving current, and further the vectors of the secondary magnetic flux and the secondary driving current are so controlled independently as to meet at right angles to each other. Further, in this vector control method, the magnitude of the secondary magnetic flux is controlled at a constant level and the secondary driving current is increased or decreased independently as in a DC motor. In the above-mentioned vector control method of driving an induction motor, however, since there exists a mutual interference between the secondary magnetic flux and the secondary driving current, the magnitude of the secondary magnetic flux is not maintained constant in practice. To overcome this problem, the so-called decoupled-vector control method is adopted, in which the mutual interference or the vector cross-term between the secondary magnetic flux and the secondary driving current is cancelled out. Theoretically there are three necessary and sufficient conditions in order to decouple two vectors of the secondary magnetic flux and the secondary driving current. These conditions are usually satisfied by adding a decoupling calculation unit to the ordinary vector control system.

In the above-mentioned decoupled-vector control method or system for an induction motor, conventionally, the induction motor is driven by an inverter activated by a PWMed pulse (for each phase). In the prior-art decoupled-vector control method or system, however, since the PWMed pulse is generated in analog fashion by comparing a sine wave signal generated by an analog sine wave generator with a triangular wave signal generated by an analog triangular wave generator, it is difficult to generate an accurate PWMed pulse. In particular, when a phase difference command signal is applied to the control system, it is impossible to control the phase difference at high response speed on the basis of relatively simple calculations.

SUMMARY OF THE INVENTION

With these problems in mind, therefore, it is the primary object of the present invention to provide a digital PWMed pulse generator by which it is possible to obtain a highly preciously PWMed pulse throughout a wide voltage range and a wide frequency range in a relatively simple system configuration.

Further, it is the other object of the present invention to incorporate the digital PWMed pulse generator with a decoupled-vector control induction motor driving system in order to control an induction motor at high response speed throughout a wide speed range and a wide torque range.

To achieve the above-mentioned object, the digital PWMed pulse generator for generating a PWMed pulse synchronizing with a sine wave signal according to the present invention comprises: (a) means for generating plural series of digital pattern data determined by pulse-width-modulating a sine wave having a basic frequency and a basic amplitude in dependence upon a triangular carrier wave having a frequency integer times higher than that of the sine wave and an amplitude equal to that of the sine wave, the pattern data being classified into each series by the number of triangles included within a half cycle of the sine wave, (b) means for selecting an appropriate series of digital pattern data classified by the number of triangles in response to an angular frequency command, (c) means for calculating other pattern data corresponding to another sine wave signal having an amplitude smaller than that of the selected pattern data in response to a voltage control ratio command, and (d) means for generating a pulse-width-modulated pulse on the basis of the calculated pattern data.

BRIEF DESCRIPTION OF THE DRAWINGS

The features and advantages of the digital PWMed pulse generator according to the present invention over the prior art analog PWMed pulse generator will be more clearly appreciated from the following description taken in conjunction with the accompanying drawings in which like reference numerals designate corresponding elements or sections throughout the drawing thereof and in which.

DETAILED DESCRIPTION OF THE PREFERRED EMBODIMENTS

To facilitate understanding of the present invention, a brief reference will be made to a prior-art pulse width modulated (PWMed) pulse generator with reference to the attached drawing.

Figure 1:
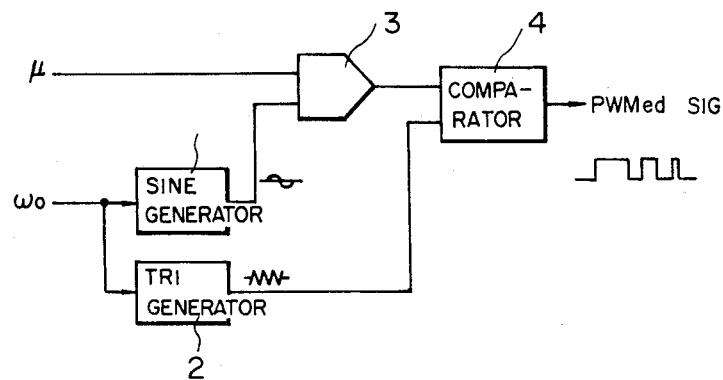
FIG. 1 is a schematic block diagram of an example of prior-art analog PWMed pulse generators.

FIG. 1 shows an example of the prior-art PWMed pulse generator, which generates a PWMed pulse in analog fashion on the basis of a sine wave signal and a triangular wave signal having a frequency several times higher than that of the sine wave signal. In FIG. 1, the generator includes a sine wave generator 1, a triangular wave generator 2, a multiplier 3, and a comparator 4. The sine wave generator 1 generates a first sine wave signal having a constant amplitude and a frequency equal to an angular frequency command signal $w_0$. The triangular wave generator 2 generates a triangular wave (carrier) signal having the same constant amplitude as that of the sine wave signal and a frequency n times higher than the angular frequency command signal $w_0$. The multiplier 3 generates a second sine wave signal the amplitude of which is $\mu(\leq 1)$ times lower than that of the first sine wave signal. Therefore, if $\mu=1$, the amplitude of the second sine wave signal outputted from the multiplier 3 is equal to that of the first sine wave signal outputted from the sine wave generator 1.

The comparator 4 compares the second sine wave signal with the triangular wave signal and outputs a logically high level signal when the second sine wave signal exceeds the triangular wave signal in voltage level and a logically low level signal when the triangular wave signal exceeds the second sine wave signal in voltage level. Therefore, the lower the amplitude of the second sine wave signal, the narrower the pulse width (high-level) of the PWMed signal.

In the PWMed pulse generator as described above, however, since the sine wave signal is compared with the triangular wave signal in analog fashion, it is impossible to obtain an accurate PWMed pulse when amplitudes of the sine wave and the triangular wave signal inevitably vary and further an offset voltage of the comparator 4 fluctuates due to change in ambient temperature, for instance. In particular, where the voltage control ratio $\mu$ is relatively small and the frequency command $w_0$ is extremely low, it is difficult to generate a precisely PWMed pulse in dependence upon the sign wave signal and the triangular wave signal. Of course, it is possible to eliminate the above-mentioned drawbacks in some way. In this case, however, the generator may become great in size, cost, the number of elements, etc.

Figure 2:
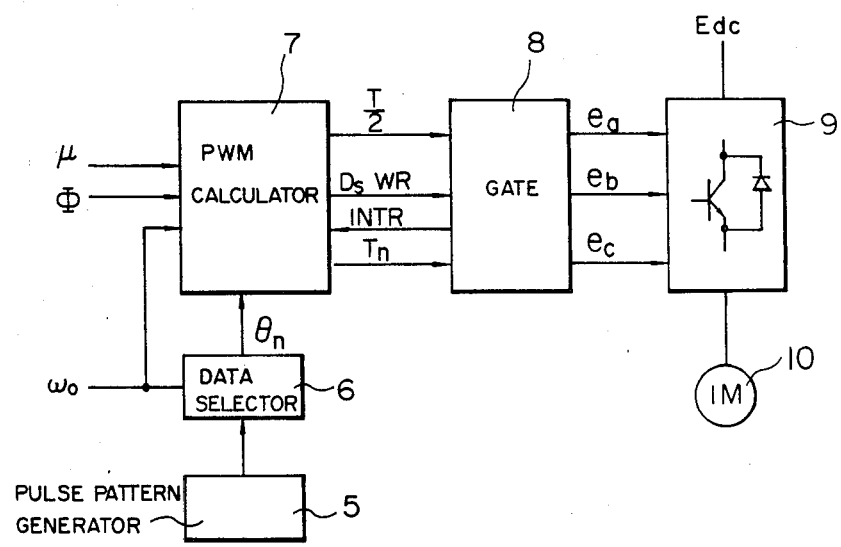
FIG. 2 is a schematic block diagram of the digital PWMed pulse generator according to the present invention.

In view of the above description, reference is now made to an embodiment of the sine-synchronizing triangular wave PWMed pulse generator according to the present invention when applied to drive an induction motor with reference to FIG. 2. The generator comprises a pulse pattern generator 5, a pattern selector 6, a PWM calculator 7, and a logic gate circuit 8 in order to generate three-phase PWMed pulses. The generated PWMed pulses trigger each switching element in an inverter 9 to drive an induction motor 10.

The pulse pattern generator 5 generates plural series of basic digital pattern data $\theta_n$ determined by pulse-width-modulating a sine wave having a basic frequency $w_B$ and a basic amplitude in dependence upon a triangular carrier wave having a frequency integer times higher than that of the sine wave and an amplitude equal to that of the sine wave. Further, the plural series of the pattern data $\theta_n$ are classified by the number P of trianles included within a half cycle of the sine wave. In general, the number P is increased with decreasing sine wave frequency.

The data selector 6 selects a series of pattern data $\theta_n$ determined by PWMing the basic sine wave on the basis of triangles of an appropriate number P in response to an angular frequency command $w_0$.

The PWM calculator 7 calculates another series of pattern data $\theta_x$ corresponding to an amplitude smaller than the basic amplitude in response a voltage control ratio command ($\mu \leq 1$), additionally and time pattern data $t_n$ corresponding to time intervals between each triangle-apex to each nearest intersection point between sine wave and triangular wave. The calculator 7 further generates triangle slop data $D_s$ (positive slope and negative slope) and a half period $T/2$ of the triangle wave.

The logic gate circuit 8 generates each phase PWMed signal $e_a$, $e_b$, $e_c$ on the basis of the calculated time pattern data $t_n$, the generated triangle slope data $D_s$ and the half period $T/2$. Further, in FIG. 2, symbol WR designates a write command; symbol INT designates an interruption command.

Figure 3:
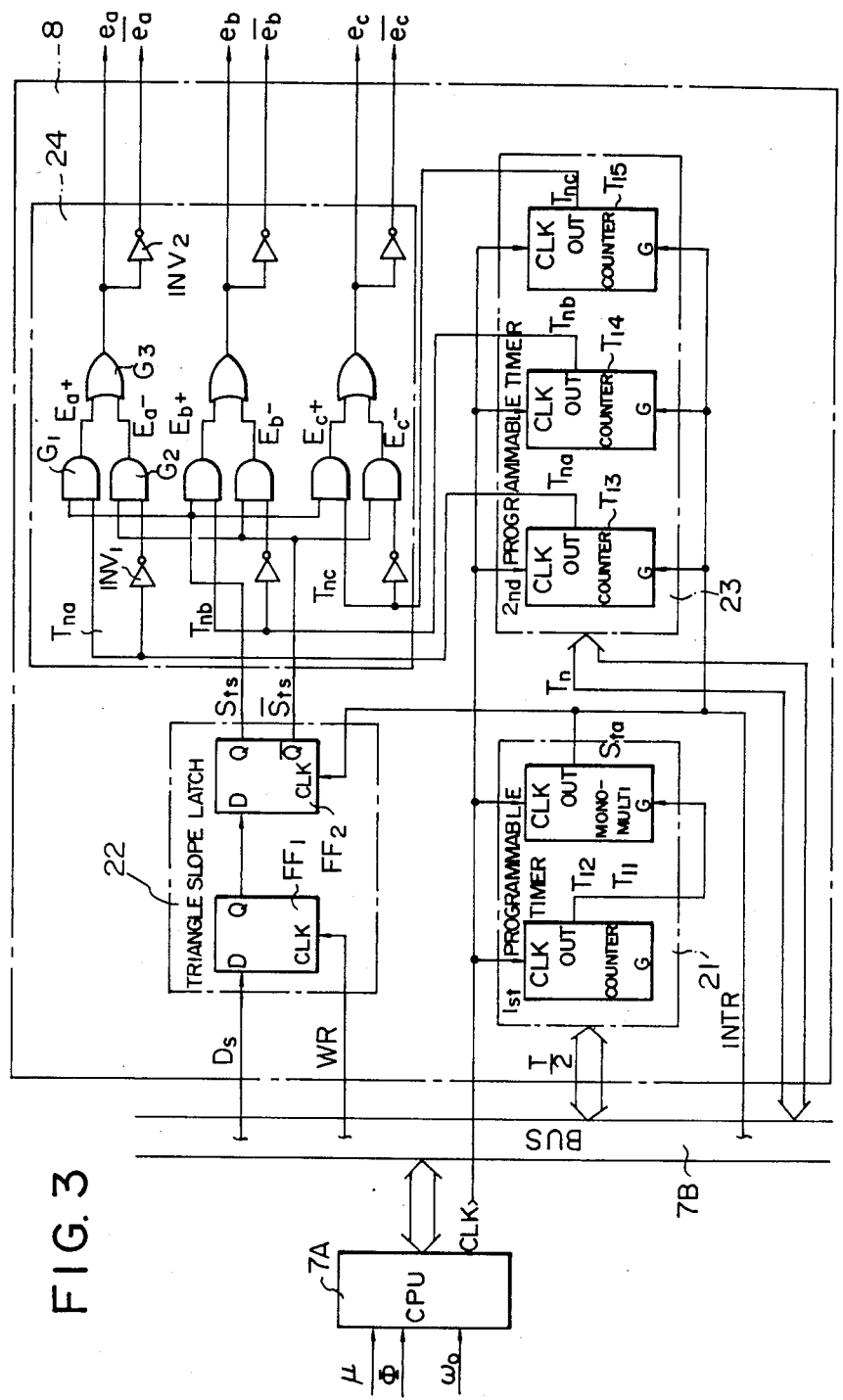
FIG. 3 is a more detailed block diagram of an example of the logic gate circuit incorporated with the digital PWMed pulse generator according to the present invention.
Figure 4:
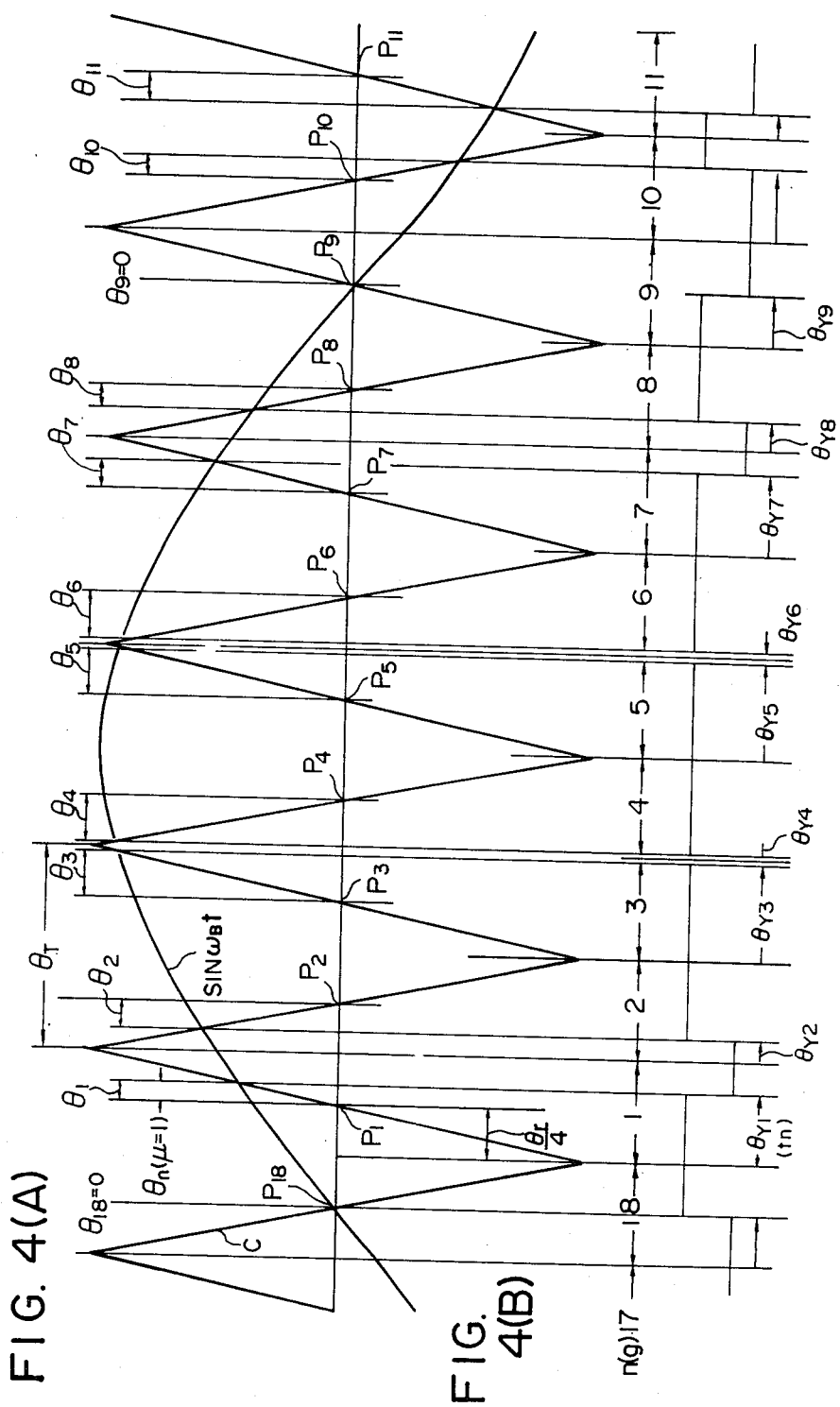
FIG. 4(A) is a graphical representation showing an intersecting state of a sine wave and a triangular wave, in which nine triangles intersects with the sine wave during a half cycle of the sine wave in cynchronization with each other, for assistance in explaining pulse pattern data.
FIG. 4(B) is a graphical representation showing a PWMed pulse obtained by the two waves shown in FIG. 4(A), in which the pulse signal is at high-voltage level when the sine wave exceeds the triangular wave in amplitude but at low-voltage level when the triangular wave exceeds the sine wave in amplitude.
Figure 5:
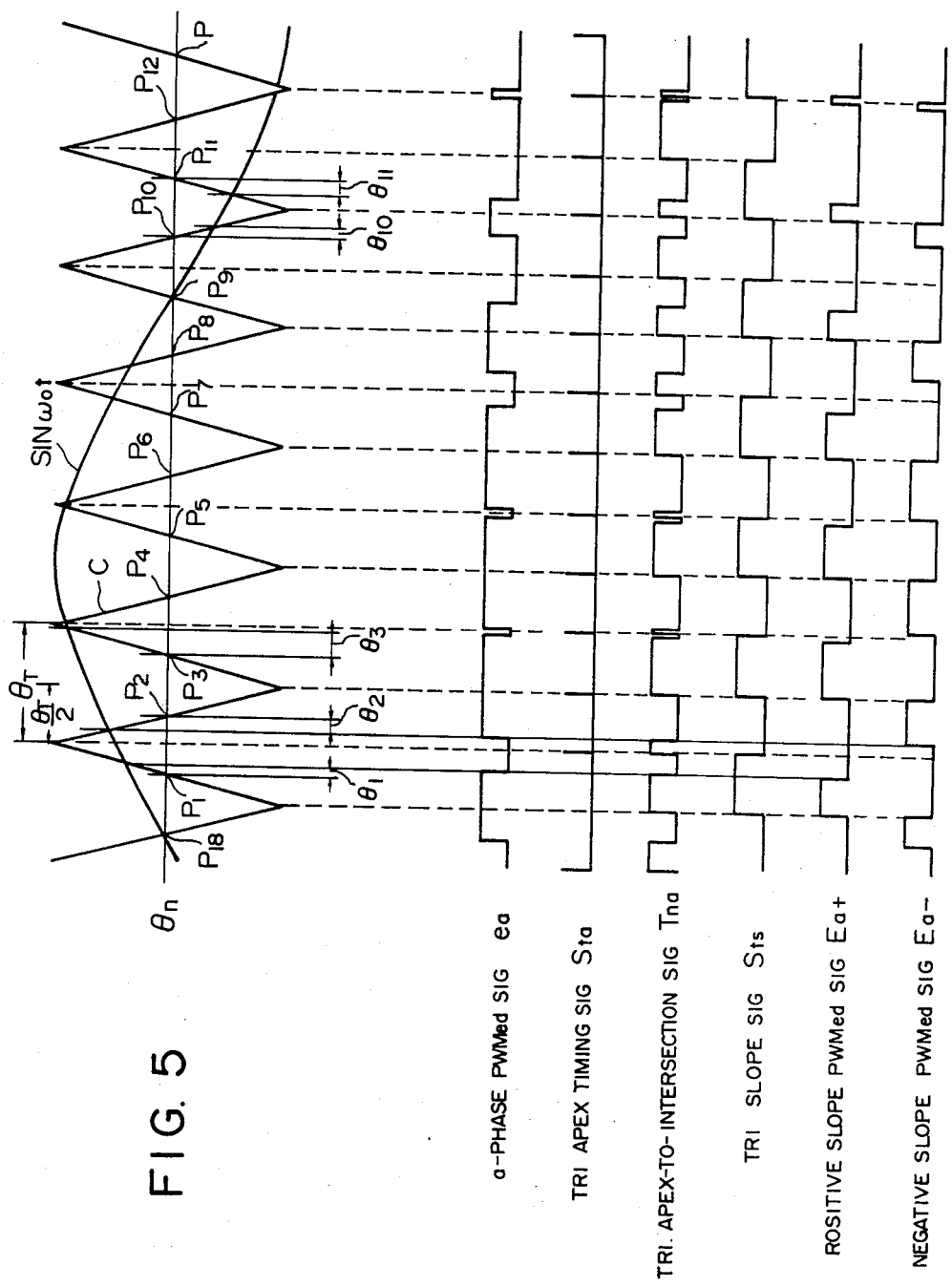
FIG. 5 is a timing chart of various signals generated in the logic gate circuit shown in FIG. 3 with respect to the mutual intersections of the sine wave and the triangular wave, for assistance in explaining the operation of the logic gate circuit.

With reference to FIGS. 3, 4, and 5, each element or section will be described in more detail hereinbelow. The pulse pattern generator 5 generates plural series of basic digital pattern data $\theta_n$ being classified by the number P of triangular (carrier) wave included within a half period of a sine wave. The above basic means that the amplitude of the sine wave is equal to that of the triangular wave. The above pulse pattern generator 5 is made up of read-only-memory units, for instance. Here, where the DC voltage of the inverter 9 is $E_{dc}$ and the amplitude voltage of the sine wave is $|E|$, the voltage control ratio $\mu$ is expressed as follows:

$$\mu = \frac{|E|}{E_{dc}/2} \leq 1 \tag{1}$$

The number P of carrier signals included within a half period of a sine wave $SIN\ w_Bt$ is determined to be multiples of three as follows:

$$P = 6m + 3 \quad (m = 0, 1, 2, \ldots) \tag{2}$$

This is because it is possible to perfectly synchronize the triangular wave with the sine wave while eliminating the harmful influence due to higher harmonics.

FIG. 4(A) shows basic digital pattern data $\theta_n$ by way of example, in which nine (P=9) triangles are included within a half cycle of the sine wave $SIN\ w_Bt$. The PWMed pulse between the two are also shown in FIG. 4(B). The logically high voltage levels of the PWMed pulse correspond to ranges within which the amplitude of the sine wave exceeds that of the triangular wave. $P_1$ to $P_9$ denotes a series of sampling points of pattern data $\theta_n$.

As understood by FIG. 4(A), the high level of the PWMed pulse can be obtained, when each point of intersection between the two waves is determined. In the present embodiment, a series of the basic pattern data $\theta_n$ ($\theta_1, \theta_2, \ldots$) are angular intervals from each sampling point $P_n$ ($P_1, P_2, \ldots$) (intersections between the triangular wave and the abscissa) to each point of intersection between the two waves. The above pattern data $\theta_n$ are listed in tables being classified according to the number P of triangles included within a half cycle of the sine wave.

FIG. 4(A) shows a basic pattern data ($\mu$=1) obtained when the sine wave amplitude is equal to the triangular wave amplitude.

Howevedr, if $\mu \neq 1$, $\theta_n$ can simply be calculated as follows:

$$\theta_x = \mu \cdot \theta_n \tag{3}$$

where $\theta_x$ denotes pattern data determined when $\mu$ is not 1. The above expression (3) indicates $\theta_x$ is proportional to $\theta_n$. This is because it is possible to consider that each part of the sine wave corresponding to $\theta_n$ (from $P_n$ to an intersection between the two waves) is approximately linear within a relatively short angular intervals Further, in the case $\mu > 1$, $\theta_x$ is partially further corrected in the expression (3).

Further, in this embodiment, the above pattern data $\theta_x$ is further calculated in order to transform the data $\theta_x$ into data $\theta_y$ representative of each angular interval between each triangle apex to each point of intersection between the two waves.

The above transformation can be made by the following expressions, where $\theta_T$ denotes a period of the triangular wave:

When the slope of the triangular wave is positive:

$$\theta_y = \theta_T/4 + \theta_x \text{ (sine wave: 0° to 180°)} \tag{4}$$

$$\theta_y = \theta_T/4 - \theta_x \text{ (sine wave: 180° to 360°)} \tag{5}$$

When the slope of the triangular wve is negative:

$$\theta_y = \theta_T/4 - \theta_x \text{ (sine wave: 0° to 180°)} \tag{6}$$

$$\theta_y = \theta_T/4 + \theta_x \text{ (sine wave: 180° to 360°)} \tag{7}$$

The above four expressions are easily understandable with reference to FIG. 4(A). Further, FIG. 4(A) indicates that when the triangular wave slope is positive, the PWMed pulse is at high level within the angular ranges $\theta_{yn}$; however, when the triangular wave slope is negative, the PWMed pulse is at low level within the angular range $\theta_{yn}$.

The above $\theta_{yn}$ are angular data. Therefore, in reality, the $\theta_{yn}$ is further transformed into time pattern data $t_n$ in accordance with the following expressions:

$$t_n = \theta_{yn} \cdot \frac{\pi}{180} \cdot \frac{1}{w_0} = \frac{\theta_{yn}}{360} \cdot \frac{1}{f} \tag{8}$$

(sine $w_0 = 2\pi f$)

In summary, (1) basix pattern data $\theta_n$ ($\mu$=1) are listed in tables being classified by the number P; (2) the pattern data having an appropriate number P is selected in response to an angular frequency command $w_0$; (3) the selected pattern data $\theta_n$ is calculated in accordance with expression (3) as $\theta_x = \mu \cdot \theta_n (\mu \leq 1)$; (4) $\theta_x$ is further transformed into angular apex-to-intersection data $\theta_y = \theta T/4 \pm \theta_x$ ($\theta_T$: triangular wave period) under consideration of triangular wave slope in accordance with expressions (4) to (7); (5) the angular interval data $\theta_y$ is further transformed into the time interval data $t_n$ in accordance with expression (8).

Further, description has been made only of a single phase. However, in the case where three-phase PWMed pulses are required for driving a three-phase induction motor, each PWMed pulses should be 120 degrees out-of-phase with each other. Therefore, if the a-phase pattern data are $t_{na}$, the b-phase pattern data are $t_{nb} = t_{na} + t_0$; the c-phase pattern data are $t_{nc} = t_{na} - t_0$, where $t_0$ is a time corresponding to 120 degrees. Further, the relationship between these three-phase pattern data can vectorically be expressed as follows:

$$\dot{i}_{nc} = -(\dot{i}_{na} + \dot{i}_{nb}) \tag{9}$$

On the basis of pattern data $t_n$ which have been calculated in response to an angular frequency command $w_0$ and a voltage control ration $\mu$, the logical gate section 8 generates a PWMed pulse as explained below: With reference to FIG. 3, the logical gate section 8 comprises a first programmable timer circuit 21 including a counter $T_{11}$ and a monostable multivibrator $T_{12}$, a triangle slope latch circuit 22 including two flip-flops, a second programmable timer circuit 23 including three-phase counters $T_{13}$, $T_{14}$ and $T_{15}$, and a logic circuit 24 including inverters, AND gates and OR gates.

The first programmable timer circuit 21 serves to generate a triangle apex timing signal $S_{ta}$ as shown in FIG. 5, being connected to the PWM calculator 7A (shown as a CPU in FIG. 3) through a bus 7B. The first programmable timer circuit 21 includes the counter $T_{11}$ and the monostable multivibrator $T_{12}$. A time value T/2 (corresponding to a half period of the triangular wave signal) is set to the first counter $T_{11}$ from the CPU 7A periodically. This time value T/2 is counted down by a series of clock pulses. Therefore, the counter $T_{11}$ generates a pulse timing signal for each half cycle of the triangular wave signal. The monostable multivibrator $T_{12}$ is triggered by this pulse timing signal and generates a series of triangle apex timing pulse $S_{ta}$. The short pulse width of the timing pulse $S_{ta}$ is determined by the monostable multivibrator $T_{12}$ on the basis of the number of clock signals CLK.

The triangle slope latch circuit 22 includes a first flip-flop $FF_1$ and a second flip-flop $FF_2$. A triangle slope date ("1" in positive slope, "0" in negative slope) outputted from the CPU 7A is latched by the first $FF_1$ in response to a command signal WRITE outputted from the CPU 7A. The latched triangle slope data signal $D_s$ is further latched by the second $FF_2$ in response to the triangle apex signal $S_{ta}$ outputted from the monostable multivibrator $T_{12}$. Therefore, the second $FF_2$ outputs a triangle slope signal $S_{ts}$, as shown in FIG. 5, from the Q terminal thereof. That is, the signal $S_{ts}$ is at a logically high level at positive triangle slope but at a logically low level at negative triangle slope. Further, an inverted triangle slope signal $\overline{S}_{ts}$ is outputted simultaneously from the $\overline{Q}$ terminal of the $FF_2$.

The second programmable timer circuit 23 serves to generate three-phase triangle apex-to-intersection signals $T_{na}$, $T_{nb}$, $T_{nc}$ (only $T_{na}$ is shown in FIG. 5). The second programmable timer circuit 23 includes a second counter $T_{13}$, a third counter $T_{14}$ and a fourth counter $T_{15}$, each being allocated to each phase. Each-phase pattern data $t_n$ (corresponding to time intervals from triangle apexes to intersection points between triangular wave and sine wave) are sequentially set to each counter in response to the triangle apex timing signal $S_{ta}$ outputted from the monostable multivibrator $T_{12}$. The set time interval $t_n$ is counted down by a series of clock pulses. Therefore, each counter $T_{13}$, $T_{14}$ or $T_{15}$ generates each apex-to-intersection signal $T_n$, which rises at triangular apexes and falls at points of intersection between the two waves.

Data transfer between the CPU 7A and the triangle slope latch circuit 22, the first and second programmable timer circuits 21, 23 is implemented by applying the triangle apex timing signal $S_{ta}$ to the CPU 7A as an interruption signal INTR.

On the basis of the triangle slope signals $S_{ts}$, $\overline{S}_{ts}$ and the apex-to-intersection signals $T_{na}$, $T_{nb}$, $T_{nc}$, the logic circuit 24 generates each-phase PWMed pulse signal $e_a$, $e_b$, or $e_c$ respectively. The operation of the logic circuit 24 will be described with respect to only a-phase hereinbelow. A first AND gate $G_1$ generates a signal $E_a{}^+$ by ANDing the positive triangle slope signal $S_{ts}$ and the apex-to-intersection signal $T_{na}$. Therefore, $E_a{}^+$ is at high level in positive triangle slopes within the ranges between triangle apexes and intersections between two waves. A second AND gate $G_2$ generates a signal $E_a{}^-$ by ANDing the negative triangle slope signal $\overline{S}_{ts}$ and the apex-to-intersection signal $\overline{T}_{na}$ inversed by a first inverter INV 1. Therefore, $E_a{}^-$ is at high level in negative triangle slopes within the ranges between triangle apexes to lintersections between two waves. By ORing both the signals $E_a{}^+$ and $E_a{}^-$ by means of a first OR gate $G_3$, it is possible to obtain an a-phase PWMed pulse $e_a$ as shown in FIG. 5. Further, by inverting the $e_a$ by means of a second inverter INV 2, it is possible to obtain an inversed a-phase PWMed signal $\overline{e}_a$, simultaneously.

In summary, the logical expressions with respect to a-phase are as follows:

$$E_a{}^+ = T_{na} * S_{ts} \qquad (10)$$

$$E_a{}^- = \overline{T}_{na} * \overline{S}_{ts}$$

$$e_a = E_a{}^+ + E_a{}^-$$

Similarly, the logicl expressions with respect to b-phase and c-phase are:

$$E_b{}^+ = T_{nb} * S_{ts} \qquad (11)$$

$$E_b{}^- = \overline{T}_{nb} * \overline{S}_{ts}$$

$$e_b = E_b{}^+ + E_b{}^-$$

$$E_c{}^+ = T_{nc} * S_{ts} \qquad (12)$$

$$E_c{}^- = \overline{T}_{nc} * \overline{S}_{ts}$$

$$e_c = E_c{}^+ + E_c{}^-$$

As described above, it is possible to obtain each-phase PWMed voltage pulse $e_a$, $e_b$, or $e_c$ by determining each real time apex-to-intersection data $T_n$ for each half period T/2 of the triangle wave signal. Further, the envelope frequency $f_o$ (motor-driving inverter frequency) of the PWMed pulse can be expressed as $$f_o = \frac{1}{T/2 \times 2 \cdot P} = \frac{1}{T \cdot P} \qquad (13)$$

where T denotes a period of the triangular wave; P denotes the number of triangles included within a half cycle of the sine wave.

In response to the PWMed pulse signals $e_a$, $e_b$, $e_c$, the inverter 9 is activated to drive the induction motor 10 in accordance with a voltage control ratio command $\mu$ and an angular frequency command $W_0$.

In the above description, in the case where the pattern data $\theta_n$ are read in the order of $\theta_1, \theta_2, \theta_3, \ldots \theta_{18}$, the motor 10 is driven clockwise, for instance; in the case where the pattern data $\theta_n$ are read in the order of $\theta_{18}, \theta_{17}, \ldots \theta_3, \theta_2, \theta_1, \theta_{18}$, the motor 10 is driven counterclockwise. That is to say, the rotational direction of the induction motor 10 can be driven in either direction by switching the sampling order of the pattern data $\theta_n$. For instance, if the motor 10 is required to switch the motor rotational direction at sampling point 3 in FIG. 6, for instance, the data are read or sampled as follows:

$$\theta_1, \theta_2, \theta_3, \theta_2, \theta_1, \theta_{18} \ldots$$

In general, when the sampling order of the data is $$n = n_{sw} + 1 \qquad (14)$$

the motor rotates in the forward direction. When the sampling order of the data is $$n = n_{sw} - 1 \qquad (15)$$

the motor rotates in the reverse direction, where n denotes the sampling points of pattern data.

The frequency switching operation of the PWMed pulse generator according to the present invention will be described hereinbelow with reference to FIG. 6. When motor speed is required to change, the angular frequency command signal $w_0$ is switched. Therefore, in general, the number P of triangles included within a half cycle of the sine wave is adjusted as already described before. This is because it is necessary to increase the number P with decreasing frequency of the sine wave signal in order to reduce a delay time within a predetermined time range.

In the case where the number P is changed, both the PWMed voltage signals $e_a$, $e_b$ and $e_c$ change violently in amplitude and phase, and therefore motor torque is reduced markedly. To eliminate these problems, the sampling position n at which the present pattern data is switched to the succeeding pattern data is determined in accordance with the following expression:

$$n_{new} = n_{old} \times \frac{P_{new}}{P_{old}} \quad (16)$$

where $n_{new}$ denotes the sampling position at which the succeeding data is selected; $n_{old}$ denotes the sampling position at which the present data is switched to the succeeding data; $P_{old}$ denotes the number P selected in the present data; $P_{new}$ denotes the number P selected in the succeeding data. Further, a decimal fraction of the ratio $P_{new}/P_{old}$ is rounded off. On the basis of the expression (16), it is possible to minimized phase difference. For instance, where the number P is switched from $P_{old}=15$ to $P_{new}=9$ at $n_{old}=5$, $$n_{new} = 5 \times \frac{9}{15} = 3$$

Figure 6:
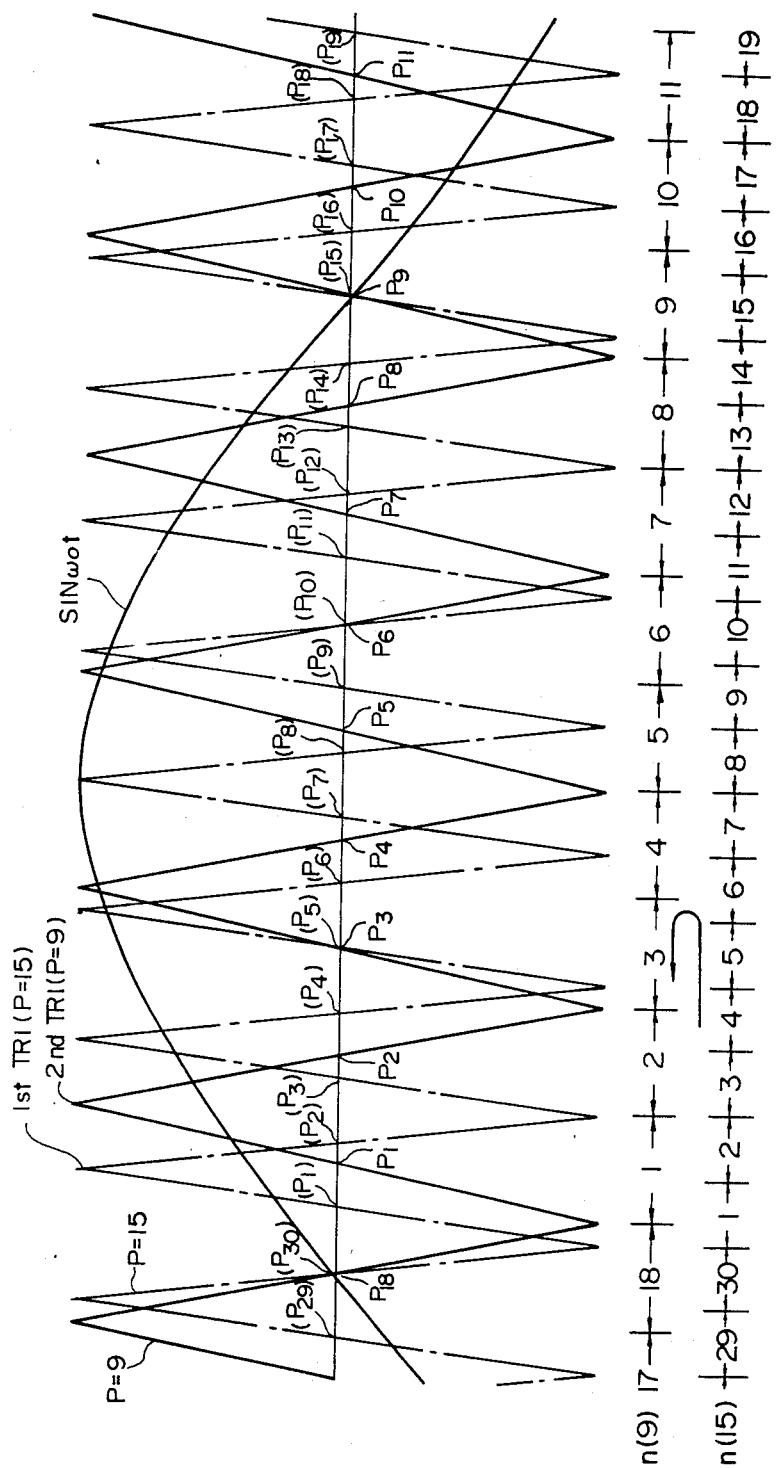
FIG. 6 is a graphical representation showing two intersection states of a sine wave and two triangular waves having different frequency, for assistance in explaining the switching operation of the number of triangular waves included within a half cycle of the sine wave.

With reference to FIG. 6, the sampling position $n_{old}=5$ ($P_5$) of the first triangular wave signal (P=15) corresponds to the sampling position $n_{new}=3$ ($P_3$) of the second triangular wave signal (P=9). Where the number P is switched from $P_{old}=15$ to $P_{new}=9$ at $n_{old}=6$.

$$n_{new} = 6 \times \frac{9}{15} = 3.6 \approx 4$$

With reference to FIG. 6, the sampling position $n_{old}=6$ ($P_6$) of the first triangular wave signal (P=15) is the nearest to the sampling position $n_{new}=4$ ($P_4$) of the second triangular wave signal (P=9).

Where the number P is switched from $P_{old}=15$ to $P_{new}=9$ at $n_{old}=7$, $n_{new}\approx4$, similarly, the sampling position $n_{old}=7$ ($P_7$) is the nearest to the sampling position $n_{new}=4$ ($P_4$).

Therefore, in the first example ($n_{new}=3$), the pattern data $\theta_n$ is sampled as follows:

$$\begin{array}{c} \theta_2, \theta_3\, \theta_4,\, \theta_5 \\ -(P=15) \longrightarrow \end{array} \Big| \begin{array}{c} \theta_3\, \theta_4,\, \theta_5 \\ \longleftarrow (P=9)- \end{array}$$

The phase controlling operation of the PWMed pulse generator according to the present invention will be described hereinbelow with reference to FIGS. 7(A) and 7(B).

In the case where the motor torque is changed or fluctuates, a phase difference command signal $\phi$ is inputted to the CPU 7A.

Figures 7A, 7B:
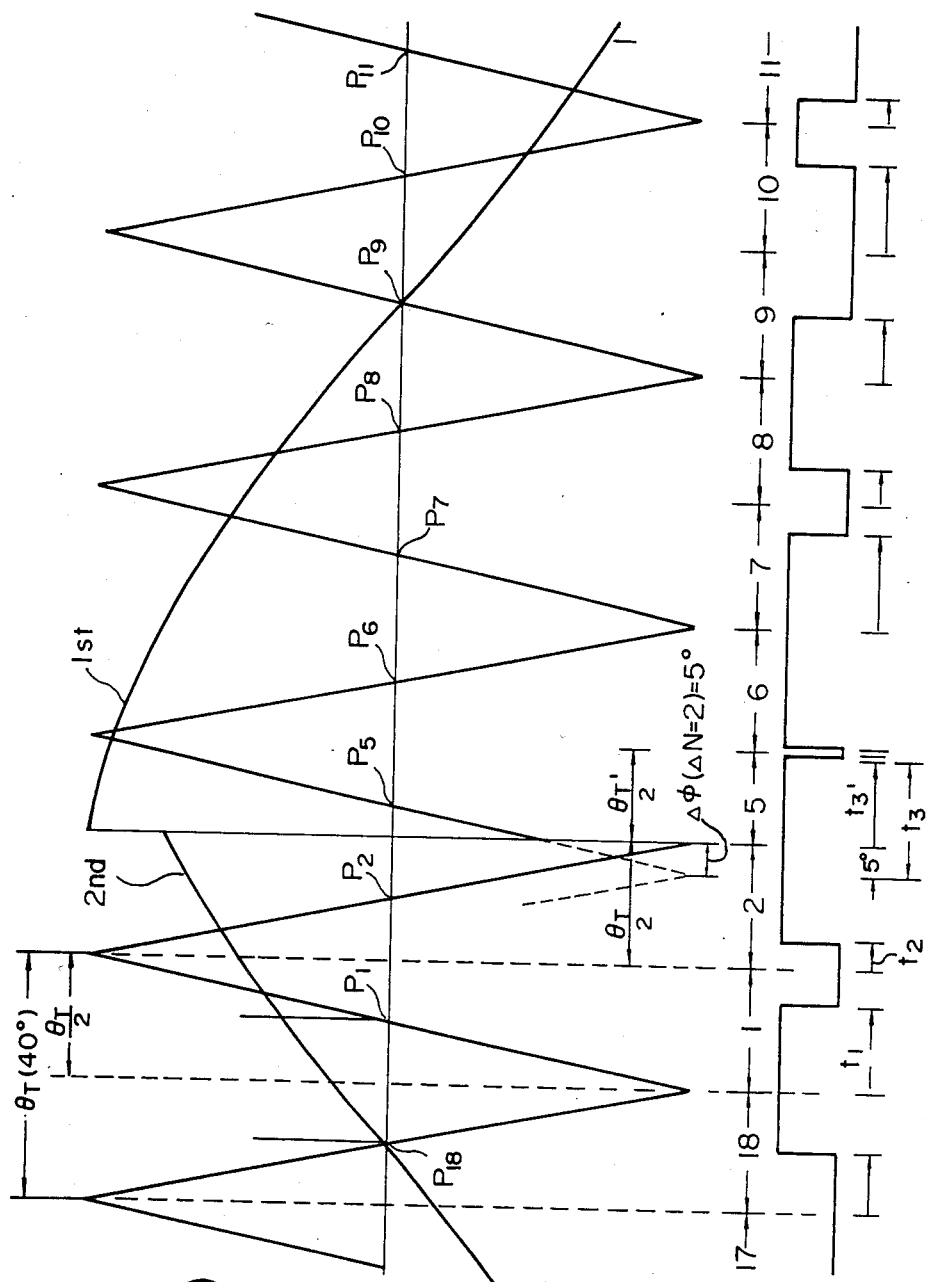
FIG. 7(A) is a graphical representation showing two intersection states of two sine waves between which there exists a phase difference and a triangular wave, for assistance in explaining phase control.
FIG. 7(B) is a graphical representation showing a PWMed pulse in which a phase difference is corrected.

FIG. 7 shows an example of the case where a 45-degree phase difference occurs in the pattern data having nine triangles within a half cycle of the sine wave. In other words, the second sine wave leads the first sine wave by a phase angle of 45 degrees. The above phase difference is detected and calculated by another element and applied to the PWM calculator 7 as a phase difference command signal $\phi$. As already explained, the CPU 7A (calculating section 7) reads angular pattern data $\theta_n$ in sequence and outputs the calculated time pattern data $t_n$ in response to the triangle apex timing signal $S_{ta}$. Therefore, it is possible to reduce the phase difference by selecting an appropriate sampling position at which pattern data are read. In an example shown in FIG. 7(A), since the half period of triangular wave signal $\theta_T/2$ is 20 degrees and the phase difference is 45 degrees, the sampling position (n=$P_2$) at which the present data is read is skipped to the sampling position (n=$P_5$) to correct the phase difference 45° by a phase angle of 40°. In contrast with this, in the case where the second sine wave lags the first sine wave by a phase angle of 45°, the sampling position (n=$P_2$) at which the present data is read is returned to the sampling position (n=$P_1$). The above skipping or returning operation can be expressed as follows:

$$\phi = \theta_T/2 \times \Delta N + \Delta\phi \text{ or} \quad (17)$$

$$\Delta N = (\phi - \Delta\phi)/\frac{\theta_T}{2}$$

where $\phi$ denotes a phase difference, $\theta_T/2$ denotes a half angular period of the triangular wave, $\Delta N$ denotes an increment or decrement from the sampling position n at which the present data is read, $\Delta\phi$ denotes a remainder.

Therefore, if the phase difference $\phi$ is given, it is possible to obtain $\Delta N$ and $\Delta\phi$ in accordance with the expression (17). In summary, the new sampling position $n_{new}$ can be expressed under consideration of the motor rotational direction and the phase difference as follows:

When the motor is rotating in the forward direction:

$$n_{new} = n_{old} + 1 \pm \Delta N \quad \begin{array}{l}(+: \text{in leading phase}) \\ (-: \text{in lagging phase})\end{array} \quad (18)$$

When the motor is rotating in the reverse direction:

$$n_{new} = n_{old} - 1 \mp \Delta N \quad \begin{array}{l}(-: \text{in leading phase}) \\ (+: \text{in lagging phase})\end{array} \quad (19)$$

Further, the remained phase difference $\Delta\phi$ can be corrected as follows: In the above example, since $\Delta\phi$ is 5 degrees, the half period T/2 (corresponds to $\theta_T/2$) of triangular wave and the pattern data $t_3$ are both reduced and set to T/2' (20°−5°=15°) and $t_3'$ ($\theta_3$−5°) as depicted in FIG. 7(B) only when the counter $T_{11}$ in the first programmable timer 21 and the counters $T_{13}$, $T_{14}$, and $T_{15}$ in the second programmable timer 23 are first set. In contrast with this, in the case the second sine wave lags the first sine wave, T/2 (corresponds to $\theta_T/2$) and $t_3$ are increased and set to T/2' (20°+5°=25°) and $t_3$, ($\theta_3$+5°).

In summary, the above calculation can be expressed as $$\begin{array}{ll} T/2' = T/2 \mp \Delta\phi & (-: \text{in leading phase}) \quad (20) \\ & (+: \text{in lagging phase}) \\ t_n' = t_n \mp \Delta\phi & (-: \text{in leading phase}) \quad (21) \\ & (+: \text{in lagging phase}) \end{array}$$

where $\Delta\phi$ denotes a time corresponding to angular phase remainder.

As described above, in case a phase difference command signal is inputted, it is possible to provide a phase difference to the PWMed signal at high response speed by skipping or returning the sampling position (ΔN) and further adjusting the triangle half period (T/2) and the pattern data ($t_n$) both first set in the counters $T_{11}$, $T_{13}$, $T_{14}$, and $T_{15}$.

The operation of the PWMed pulse generator according to the present invention will be described hereinbelow. The CPU 7A shown in FIG. 3 includes the pulse pattern generator 5, the data selector 6 and the PWM calculator 7. In response to the angular frequency command $w_0$, a basic since wave SIN $w_B t$ and the number P of triangles included within a half cycle of the sine wave are both determined.

Figure 8:
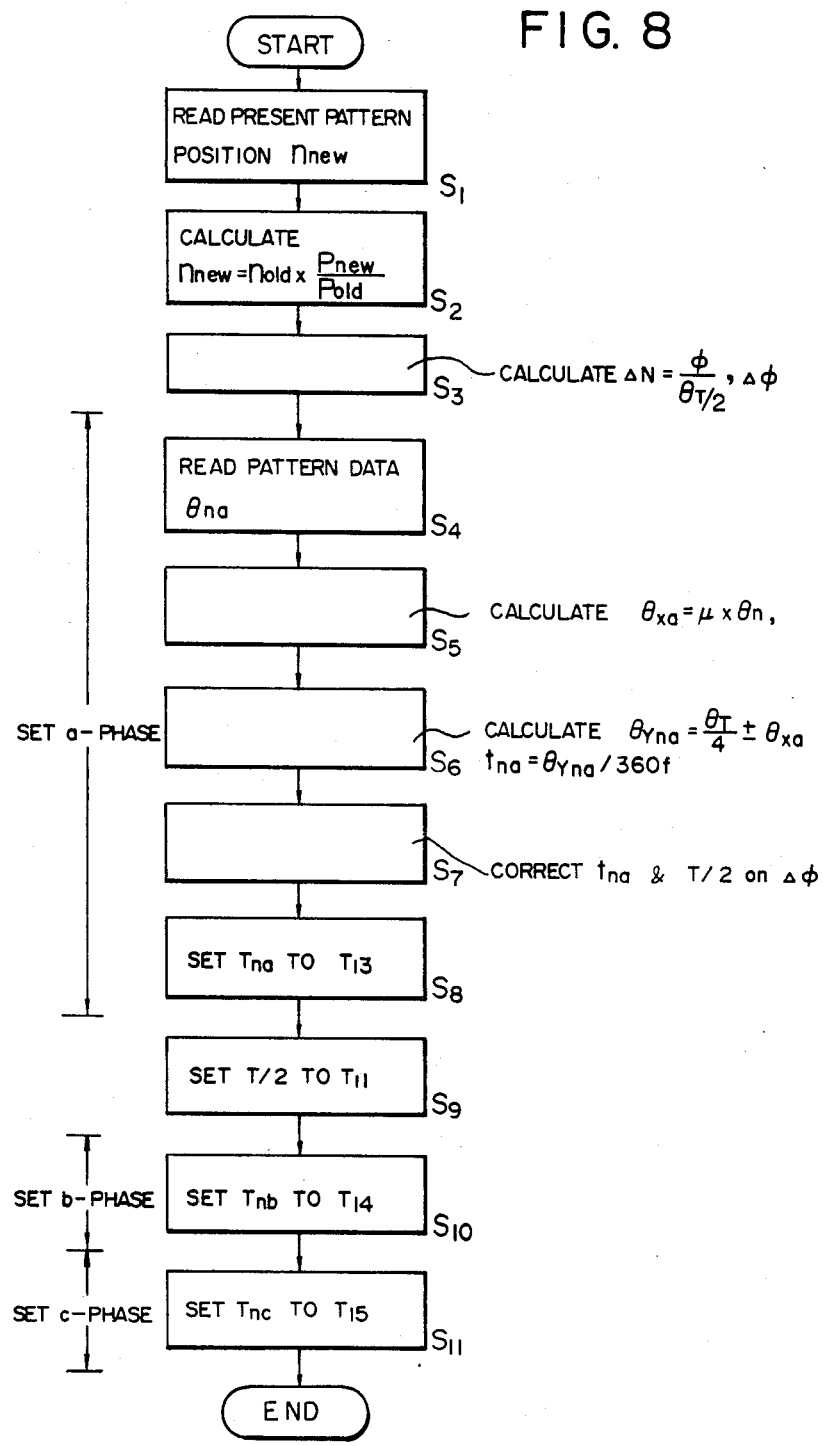
FIG. 8 is a control flowchart implemented mainly in a PWM calculator.

The operation of the PWM calculator 7 (CPU 7A) will be described with reference to a flowchart shown in FIG. 8.

Control reads the present pattern data sampling position $n_{new}$ (in step $S_1$). If the present number $P_{old}$ of triangles included within a half cycle of the sine wave signal is required to change to $P_{new}$, control calculates a new pattern sampling position $n_{new}$ in accordance with expression (16):

$$n_{new} = n_{old} \times \frac{P_{new}}{P_{old}}$$

(in step $S_2$). Further, if there exists a phase difference $\phi$ between the present PWMed pulse signal and the succeeding PWMed pulse signal, the phase difference $\phi$ is detected, and the number ΔN of data sampling position to be skipped or returned is calculated in accordance with expression (17):

$$\Delta N = \frac{\phi}{T/2} - \Delta\phi$$

(in step $S_3$). In step $S_3$, if there exists Δφ, this value is temporarily stored for adjusting the time pattern data $t_n$ and the half period of trianglar wave T/2 later. Control reads a-phase angular pattern data $\theta_{na}$ determined on the basis of the angular frequency command $w_0$ and the corresponding number P from the ROM arranged in the CPU 7A (in step $S_4$). In response to the present voltage control command $\mu$, the angular pattern data $\theta_x$ is calculated in accordance with expression (3): $\theta_x = \mu \cdot \theta_n$ (in step $S_5$).

Control further calculates a triangular apex-to-intersection $\theta_y$ in accordance with expressions (4) to (7): $\theta_y = \theta_T/4 + \theta_x$. Since $\theta_y$ is an angular value, $\theta_y$ is further transformed into a time value $t_{na}$ (in step $S_6$). Control corrects the a-phase time pattern data $t_{na}$ and the half triangle period T/2 on the basis of the phase remainder Δφ obtained in step $S_3$ (in step $S_7$). The corrected data $T_{na}$ is set to the counter $T_{13}$ (in step $S_8$). The corrected half period T/2 is set to the counter $T_{11}$ (in step $S_9$). Similarly, the corrected data $T_{nb}$ is set to the counter $T_{14}$ (in step $S_{10}$); the corrected data $T_{nc}$ is set to the counter $T_{15}$ (in step $S_{11}$).

Figure 9:
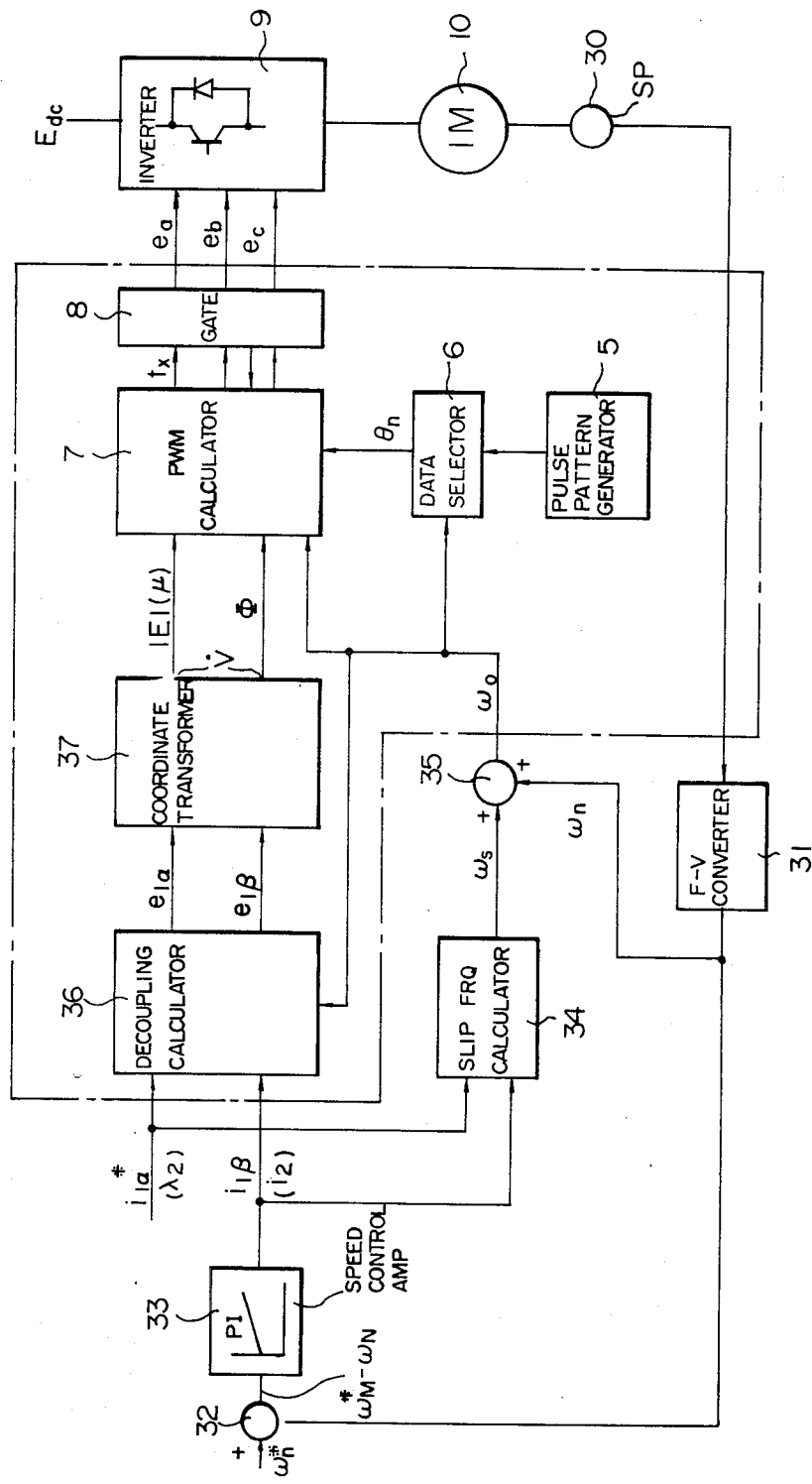
FIG. 9 is an embodiment of a schematic block diagram of a decoupled-vector control induction motor driving system in which the digital PWMed pulse generator according to the present invention is incorporated.

FIG. 9 is a block diagram showing an example of application of the digital PWMed pulse generator according to the present invention to a decoupled-vector control induction motor driving system. In this driving system, the primary current corresponding to the secondary magnetic flux and the primary current corresponding to the secondary driving current are controlled independently in such a way that these two vectors meet at right angles to each other. Here, the above-mentioned decoupled-vector implies that the mutual interference produced between the secondary magnetic flux and secondary driving current is cancelled out.

To facilitate understanding of the motor driving system, the principle of the decoupled-vector control method for an induction motor will be described hereinbelow. It is well known that an induction motor can be treated mathematically as a simplified model in dependence upon two-axis theory. In this theory, all three-phase electrical values including those on the secondary side are transformed into two-phase electrical values on the primary side, on the assumption that higher harmonics, iron loss, magnetic saturation and so on are all ignored and signals are trigonometric function.

In accordance with this two-axis theory, the primary-side voltage-current equation and the torque of a three-phase induction motor of squirrel cage type can be represented on an α-β coordinate which rotates in synchronization with the primary voltage as follows:

$$\begin{vmatrix} e_{1\alpha} \\ e_{1\beta} \\ e_{2\alpha} \\ e_{2\beta} \end{vmatrix} = \begin{vmatrix} (r_1 + L_\sigma P) & -L_\sigma w_0 & \frac{M}{L_2} P & \frac{M}{L_2} w_0 \\ L_\sigma w_0 & (r_1 + L_\sigma P) & \frac{M}{L_2} w_0 & \frac{M}{L_2} P \\ \frac{Mr_2}{L_2} & 0 & \left(\frac{r_2}{L_2} + P\right) & -(w_0 - w_n) \\ 0 & \frac{Mr_2}{L_2} & w_0 - w_n & \left(\frac{r_2}{L_2} + P\right) \end{vmatrix} \begin{vmatrix} i_{1\alpha} \\ i_{1\beta} \\ \lambda_{2\alpha} \\ \lambda_{1\beta} \end{vmatrix}$$

(I)

$$T = \frac{3}{2} (\lambda_{2\beta} i_{2\alpha} - \lambda_{2\alpha} i_{2\beta})$$

(II)

where lower suffix α denotes the component on the α axis; lower suffix β denotes the component on the β axis; lower suffix 1 denotes the values on the primary side; lower suffix 2 denotes the values on the secondary side but transformed to the primary side, and further e denotes the voltage; i denote the current; λ denotes the magnetic flux; r denotes the resistance; M denotes the mutual inductance; L denotes the inductance; $L_\sigma$ denotes the equivalent leakage inductance $L_\sigma = (L_1 L_2 - M^2)/L_2$; P denotes the differential operator or Laplace operation; P=d/dt; $w_0$ denotes instantaneous angular velocity of the primary voltage vector or angular frequency of voltage-controlled power source; $w_n$ denotes the rotor angular frequency.

The above expression (I) indicates the relationship between the primary voltage and the primary current and the relationship between the secondary voltage and the secondary magnetic flux, while including phase relationship.

The above expression (II) indicates that if the secondary magnetic flux $\lambda_{2\alpha}$ or $\lambda_{2\beta}$ is constant, the torque is then completely proportional to the secondary current $i_{2\beta}$ or $i_{2\alpha}$. In order to control the induction motor as in a DC motor, it is necessary to adopt vector control method. In this vector control method, both the vectors of the secondary magnetic flux $\lambda_2$ and the secondary driving current $i_2$ are controlled independently so as to meet at right angles to each other. Although it is possible to determine the α- and β-axis in any way, it is preferable to determine the α-axis to be in the direction of the secondary magnetic flux $\lambda_2$ and the $\beta$-axis to be in the direction of the secondary driving current $i_2$. If determined as described above, the condition that $\lambda_2$ and $i_2$ meet at right angles to each other are as follows:

$$\lambda_{2\alpha}(i_{1\alpha}) = \text{const}, \lambda_{2\beta} = 0 \qquad \text{(III)}$$
$$i_{2\alpha} = 0, i_{2\beta}(i_{1\beta}) = \text{variable}$$

The above expression indicates that the secondary magnetic flux $\lambda_{2\alpha}$ is controlled at a contract value only on the $\alpha$-axis and the secondary driving current $i_{2\beta}$ is variably controlled only on the $\beta$-axis, as in a DC motor.

The above conditions indicated by expression (III) can be attained by controlling the slip angular frequency as follows:

$$w_s = w_0 - w_n = \frac{Mr_2}{L_2\lambda_{2\alpha}} \cdot i_{1\beta} = \frac{i_{1\beta}}{i^*_{1\alpha} \cdot \tau_2} \qquad \text{(IV)}$$

where $w_s$ denotes the slip angular frequency.

Once the $\alpha$ and $\beta$ axes are determined as described above, the primary current $\alpha$-axis component $i_{1\alpha}$ corresponds to the secondary magnetic flux $\lambda_{2\alpha}$ and the primary current $\beta$-axis component $i_{1\beta}$ corresponds to the secondary driving current $i_{2\beta}$.

The above expressions (III) and (IV) are essential to decouple the secondary flux from the secondary current but are not perfect, since there still remains the electromotive force caused by the mutual interference (cross terms) between $\alpha$-axis component and $\beta$-axis component on the primary side.

The decoupling control can be achieved by the following conditions:

$$e_{1\alpha} = r_1 i^*_{1\alpha} - L_\sigma w_0 i_{1\beta} \qquad \text{(V)}$$
$$e_{1\beta} = r_1 i_{1\beta} + L_1 w_0 i^*_{1\alpha}$$
wherein $e^*_{1\alpha} = i^*_{1\alpha} \cdot r_1$
$e^*_{1\beta} = i_{1\beta} \cdot r_1 + L_\sigma P)$ wherein the upper suffix * denotes the reference or command value applied from the outside when a motor is driven.

The above expressions indicate the decoupling condition. In more detail, in order to determine the primary voltage $e_{1\alpha}$, the value $L_\sigma W_0 i_{1\beta}$ obtained by multiplying the primary current $i_{1\beta}$ (which controls the secondary current $i_{2\beta}$) by supply voltage angular frequency $w_0$ and coefficient $L_\sigma$ is subtracted from the value $r_1 i^*_{1\alpha}$ obtained by multiplying the reference primary current $i^*_{1\alpha}$ (which controls the secondary flux $\lambda_{2\alpha}$ at a constant level) by the primary resistance $r_1$. Similarly, in order to determine the primary voltage $e_{1\beta}$, the value $L_w o_0 I^*_{1\alpha}$ obtained by multiplying the reference primary current $i^*_{1\alpha}$ by supply voltage angular frequency $w_0$ and coefficient $L_1$ is added to the value $r_1 i_{1\beta}$ obtained by multiplying the primary current $i_{1\beta}$ by the primary resistance $r_1$.

In expression (IV), since $\lambda_{1\alpha}$ is constant (or $i_{1\alpha}$ is constant), slip frequency $w_s$ is proportional to the primary current $i_{1\beta}$.

In summary, the expressions (IV) and (V) are necessary and sufficient conditions to decouple the secondary flux and the secondary current and to keep the magnitude of the secondary flux $\lambda_{2\alpha}$ (i.e. $i_{1\alpha}$) constant in driving an induction motor by means of a voltage-controlled power source.

In order to realize the decoupling control, the values of the primary current $i_{1\alpha}$ corresponding to the secondary flux $\lambda_{2\alpha}$ and the primary current $i_{1\beta}$ corresponding to the secondary current $i_{2\beta}$ are necessary for controlling information in addition to rotor angular frequency $w_n$. It is more practical to use reference or command values in the actual control. The reference primary current $i^*_{1\alpha}$ can be obtained on the basis of the reference secondary flux $\lambda_{2\alpha}$ as follows: Similarly, the primary current $i_{1\beta}$ can be obtained on the basis of both the reference torque $T^*$ and the reference secondary flux $\lambda^*_{2\alpha}$ as follows:

$$i^*_{1\alpha} = \lambda^*_{2\alpha}/M$$

$$i^*_{1\beta} = \frac{L_2}{M\lambda^*_{2\alpha}} T^*$$

The secondary reference flux $\lambda^*_{2\alpha}$ is constant and therefore the reference torque $T^*$ can be determined by the primary current $i_{1\beta}$ obtained through the PI speed control amplifier (proportional integrator) by which the difference between the reference rotor angular velocity $w^*_n$ and the actual rotor angular velocity $w_n$ are integrated.

In FIG. 9, the decoupled-vector control motor driving system includes the digital PWMed pulse generator according to the present invention, which is made up of the pulse pattern generator 5, the data selector 6, the PWM calculator 7, and the logical gate circuit 8, as already described in detail. The system further includes a motor speed sensor 30, a frequency-voltage converter 31, a subtractor 32, a speed control amplifier (proportional integrator) 33, a slip frequency calculator 34, an adder 35, a decoupling calculator 36, a coordinate transformer 37. The induction motor 10 is driven by the inverter 9 activated in response to three PWMed voltage signals $e_a$, $e_b$, $e_c$ generated by the decoupled-control motor driving system.

The motor speed is detected by the speed sensor 30 and the detected angular frequency $w_n$ indicative of motor speed is converted into a voltage corresponding to $w_n$ through the frequency-to-voltage converter 31. The detected frequency $w_n$ is subtracted from a preset angular frequency command $w_n^*$ by the substractor 32. The differential value $(w_n^* - w_n)$ is applied to the speed control amplifier 33. This amplifier 33 is of proportional integrator (PI) for integrating the difference $(w_n^* - w_n)$ to determine a primary reference current $i_{1\beta}$. A decoupling calculator 36 calculates the decoupling values $(-L_\sigma w_0 i_{1\beta}, L_1 w_0 i^*_{1\alpha})$ in order to output the primary voltages $e_1$ and $e_{1\beta}$ in response to the primary reference current $i^*_{1\alpha}$ (constant secondary flux $\lambda_{2\alpha}$) and the primary current $i_{1\beta}$ (variable secondary current $i_{2\beta}$) in accordance with the expression (V).

The slip frequency calculator 34 calculates the slip angular frequency $w_s$ in accordance with expression (IV) as follows:

$$w_s = \frac{Mr_2}{L_2\lambda_{2\alpha}} \cdot i_{1\beta} = \frac{i_{1\beta}}{i^*_{1\alpha} \cdot \tau_2}$$

The adder 35 calculates the supply voltage angular frequency $w_0$ as follows:

$$w_0 = w_n + w_s$$

The coordinate transformer 37 transforms the primary voltage $e_{1\alpha}$, $e_{1\beta}$ into porlar coordinate values in accordance with the following expressions:

$$\dot{v} = |E|, \angle \phi \quad \text{(VI)}$$

$$|E| = \sqrt{e_{1\alpha}^2 + e_{1\beta}^2} \quad \text{(VII)}$$

$$\phi = \tan^{-1} e_{1\beta}/e_{1\alpha} \quad \text{(VIII)}$$

The above $|E|$ corresponds to the voltage control ratio $\mu$ as already explained on the basis of expression (1); the above $\phi$ corresponds to the phase command as already explained in FIGS. 2 and 3. In accordance with the commands $|E|$ ($\mu$), $\theta$, and $w_0$, the PWM calculator 7 anthe logical gate circuit 8 generates three-phase phase-width-modulated pulses $e_a$, $e_b$, $e_c$ by the method as already described in detail before.

Further, the relationship between the polar coordinate signals $v = |E|$, $<\phi$ and the PWMed pulses e a, $e_b$, $e_c$ can be expressed as $$e_a = |E| \cos \theta_p$$
$$e_b = |E| \cos (\theta_p - \tfrac{2}{3}\pi) \quad \text{(IX)}$$
$$e_c = |E| \cos (\theta_p + \tfrac{2}{3}\pi)$$

where $\theta_p$ denotes an angle subtended by a-phase axis and a vector V.

Figure 10:
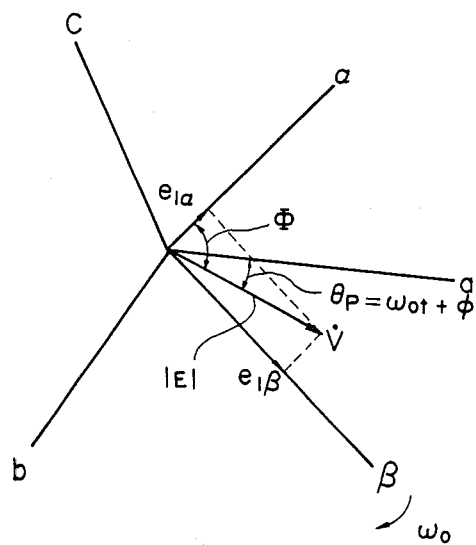
FIG. 10 is a graphical representation showing three fixed coordinates and two rotating coordinates, on which a vector indicative of voltage amplitude and phase is shown, for assistance in explaining polar coordinate transformation.

FIG. 10 shows the relationship more clearly. In FIG. 10, three-phrase axes a, b, c are fixed; two axes $\alpha$, $\beta$ are rotating at an angular speed of $w_0$. Therefore, it is possible to determine $\theta_p = w_0 t$ in motor steady state. However, in case the motor torque fluctuates or is changed, since voltages $e_{1\alpha}$, $e_{1\beta}$ also change, causing a change in phase $\phi$. If the differential value of $\phi$ is $\Delta\phi$, the angle $\theta_p$ can be expressed as $$\theta_p = w_0 t + \Delta\theta \quad \text{(X)}$$

In digitally calculating $e_a$, $e_b$, or $e_c$, this differential value $\Delta\phi$ corresponds to a change in phase during one sampling period. That is to say, it is possible to express $\phi$ as follows:

$$\Delta\phi = \phi_{old} - \phi_{new}$$

where $\phi_{old}$ denotes a phase at the preceding sampling time; $\phi_{new}$ denotes a phase at the present sampling time.

In response to the PWMed signal $e_a$, $e_b$, $e_c$, switching elements arranged in the inverter 9 are turned on or off to drive the induction motor 10 at a predetermined speed and torque. Further, in FIG. 9, the operations or functions of the elements 5, 6, 7, 8, 36, and 37 (enclosed by dot-dashed lines) may be implemented by a computer in accordance with appropriate software. In this case, it is of course necessary to input various signals $i^*_{1\alpha}$, $i_{1\beta}$, $w_0$ in digital form after converting the signals from analog to digital through appropriate converters. Further, it is also possible to further incorporate the speed control amplifier 33, the slip frequency calculator 34 and the F-V converter 31 with the microcomputer. In this case, the F-V converter 31 is configured by counters. Or else, it is possible to incorporate these elements 33, 34, 31 with another master computer which can execute the other functions such as sequence control, diagnosis control, etc.

As described above, in the digital PWMed pulse generator according to the present invention, since the PWMed pulses can be obtained in digital fashion by adjusting the number P of triangles included within a half cycle of the sine wave, it is possible to generate precise PWMed pulse signal at high response speed throughout a wide frequency range and a wide voltage range while simplifying calculation operations or processes. Further, it is possible to readily switching the direction of the PWMed pulses by switching the sampling order of pattern data. In particular, it is possible to control phase difference at high response speed by skipping or returning sampling positions and by adjusting pattern data and triangle half period first set to the counters.

Further, in the case where the digital PWMed pulse generator according to the present invention is applied to the decoupled-vector control induction motor driving system, it is possible to control an induction motor at high response speed accurately. That is to say, the speed, torque, and rotational direction, of the motor can be controlled accurately at high response speed on the basis of relatively simple calculating processes.

It will be understood by those skilled in the art that the foregoing description is in terms of a preferred embodiment of the present invention wherein various changes and modifications may be made without departing from the spirit and scope of the invention, as set forth in the appended claims.

What is claimed is:

1. A digital PWMed pulse generator for generating a pulse-width-modulated pulse synchronizing with a sine wave, which comprises:
   (a) means for generating plural series of digital pattern data determined by pulse-width-modulating a sine wave having a basic frequency and a basic amplitude in dependence upon a triangular carrier wave having a frequency integer times higher than that of the sine wave and an amplitude equal to that of the sine wave, the pattern data being classified into each series by the number of triangles included within a half cycle of the sine wave;
   (b) means for selecting an appropriate series of digital pattern data classified by the number of triangles in response to an angular frequency command; and
   (c) means for calculating other pattern data corresponding to another sine wave signal having an amplitude smaller than that of the selected pattern data in response to a voltage control ratio command; and
   (d) means for generating a pulse-width-modulated pulse on the basis of the calculated pattern data.

2. A digital PWMed pulse generator for generating a pulse-width-modulated pulse synchronizing with a sine wave, which comprises:
   (a) pattern generating means for generating plural series of basic digital pattern data $\theta_n$ determined by pulse-width-modulating a sine wave having a basic frequency and a basic amplitude in dependence upon a triangular carrier wave having a frequency integer times higher than that of the sine wave and an amplitude equal to that of the sine wave, the pattern data $\theta_n$ being angular intervals between mid-points $P_n$ of the triangular wave and intersection-points between the sine wave and the triangular wave, triangle slope data signal $D_s$ and a triangle period signal $\theta_T$ or T, the data series being classified by the number P of triangles included within a half cycle of the sine wave;

(b) data selecting means for selecting an appropriate series of digital pattern data $\theta_n$ classified by the number P of triangles in response to an angular frequency command $W_0$;

(c) PWM calculating means for calculating angular pulse pattern data $\theta_x$ proportional to a voltage control ratio command $\mu \leq 1$ in accordance with an expression $\theta_x = \mu \cdot \theta_n$, angular pulse pattern data $\theta_y$ indicative of angular intervals between each triangle apex point and each nearest intersection point between the sine wave and the triangular wave in accordance with an expression $\theta_y = \theta_T/4 \pm \theta_x$, time pulse pattern data $t_n$ in accordance with an expression $$t_n = \theta_y \frac{\pi}{180} \cdot \frac{1}{w_0} ;$$

and (d) logic circuit means for generating a triangle apex timing signal $S_{ta}$ on the basis of the half period $T/2$ of the triangular wave and clock pulses, triangle slope pulse signals $S_{ts}$, $\overline{S_{ts}}$ in response to triangle slope data signal $D_s$ and the triangle apex timing signal $S_{ta}$, apex-to-intersection pulse signals $T_n$ in response to time pulse pattern data $t_n$ and clock pulses, for ANDing the triangle slope pulse signal $S_{ts}$ and the apex-to-intersection pulse signal $T_n$ and further inverted triangle slope pulse signal $\overline{S_{ts}}$ and the inverted apex-to-intersection pulse signal $\overline{T_n}$, and for ORing the two ANDded signals to generate a PWMed pulse signal.

3. The digital PWMed pulse generator as set forth in claim 2, wherein said logic circuit means comprises:

(a) a first programmable timer for generating a triangle apex timing signal $S_{ta}$ by counting down the half period $T/2$ of the triangular wave by clock signals;

(b) a triangle slope latch circuit for generating triangle slope signals $S_{ts}$, $\overline{S_{ts}}$ in response to triangle slope data $D_s$ and the triangle apex timing signal $S_{ta}$;

(c) a second programmable timer for generating the apex-to-intersection pulse signal $T_n$ by counting down the time pulse pattern data $t_n$ by clock signals;

(d) a first AND gate for ANDing the apex-to-intersection pulse signal $T_n$ and the triangle slope signal $S_{ts}$ to generate a first ANDded signal $E_a^+$;

(e) a second AND gate for ANDing the inverted apex-to-intersection pulse signal $\overline{T_n}$ and the inverted triangle slope signal $\overline{S_{ts}}$ to generate a second ANDded signal $E_a^-$; and (f) an OR gate for ORing the first signal $E_a^+$ and the second signal $E_a^-$ to generate a PWMed pulse $e_a$.

4. A method of digitally generating a pulse-width modulated pulse synchronized with a sine wave, which comprises the following steps of:

(a) storing plural series of basic digital angular pattern data $\theta_n$ indicative of angular intervals between mid-points $P_n$ of a triangular wave and intersection-points between a basic sine wave signal and a triangular carrier wave signal having a period of $\theta_T$ by classifying the data $\theta_n$ by the number P of triangles included within a half cycle of the sine wave;

(b) selecting an appropriate series of data $\theta_n$ classified by the number P in response to an angular frequency command $w_0$;

(c) reading data $\theta$ sequentially;

(d) calculating angular pulse pattern data $\theta_x$ proportional to a voltage control ratio command on the basis of the read data $\theta_n$ in accordance with an expression $\theta_x = \mu \cdot \theta_n$;

(d) calculating angular pulse pattern data $\theta_y$ indicative of angular intervals between each triangle apex point and each nearest intersection-point between the sine wave and the triangular wave in accordance with an expression $\theta_y = \theta_T/4 \pm \theta_x$, where $\theta_T$ denotes a period of the triangular wave;

(e) calculating time pulse pattern data $t_n$ in accordance with an expression $$t_n = \theta_y \frac{\pi}{180} \cdot \frac{1}{w_0} ;$$

(f) generating triangle apex signals $T_{ta}$ by counting down a half period $T/2$ of the triangular wave by clock signals;

(g) generating triangle slope signals $S_{ts}$, $\overline{S_{ts}}$ by latching the triangle slope data in response to the triangle apex timing signal $S_{ta}$;

(h) generating an apex-to-intersection pulse signal $T_{na}$ by counting down the time pulse pattern data $t_n$ by clock signals;

(i) ANDing the apex-to-intersection pulse signal $T_n$ and the triangle wave slope signal $S_{ts}$ to generate first ANDded signal $E_a^+$;

(j) inverting the apex-to-intersection pulse signal $T_n$;

(k) ANDing the inverted apex-to-intersection pulse signal $\overline{T_n}$ and the inverted triangle slope signal $\overline{S_{ts}}$ to generate second ANDded signal $E_a^-$; and (l) ORing the first ANDded signal $E_a^+$ and the second ANDded signal $E_a^-$ to generate a PWMed signal $e_a$.

5. The method of digitally generating a pulse-width-modulated pulse as set forth in claim 4, wherein a forward-direction PWMed pulse is generated when the angular pulse pattern data $\theta_n$ are read in the forward direction and a reverse-direction PWMed pulse is generated when the angular pulse pattern data $\theta_n$ are read in the reverse direction.

6. The method of digitally generating a pulse-width-modulated pulse as set forth in claim 4, wherein when the angular frequency command $w_0$ is switched and therefore the number P of triangles included within a half cycle of the sine wave is switched from $P_{old}$ to $P_{new}$, a sampling position $n_{new}$ at which a new data $\theta_n$ is read is determined as $$n_{new} = n_{old} \times \frac{P_{new}}{P_{old}}$$

where $n_{old}$ denotes a sampling position at which last data $\theta_n$ is read.

7. The method of digitally generating a pulse-width-modulated pulse as set forth in claim 4, wherein in response to a phase-correcting signal $\phi$, a sampling position $n_{new}$ at which a new data $\theta_n$ is read is skipped by an increment $+\Delta N$ to correct a leading-phase or returned by a decrement $-\Delta N$ to correct a lagging-phase in accordance with $$\Delta N = (\phi - \Delta\phi)/\frac{\theta_T}{2},$$

where $\Delta\phi$ is a remainder, $\theta_T$ denotes a period of the triangular wave signal.

8. The method of digitally generating a pulse-width-modulated signal as set forth in claim 7, wherein if the remainder $\Delta\phi$ exists, the half triangle period T/2 corresponding to $\theta_T/2$ and the time pattern data $t_n$ are adjusted by the remainder $\Delta\phi$ only when the period T/2 and the data $t_n$ are first counted down at the succeeding sampling position $n_{new}$.

9. A decoupled-vector control motor driving system, which comprises:
  (a) speed sensing means for detecting a rotor angular frequency $w_n$ of an induction motor;
  (b) proportional integrating means for generating a primary current $i_{1\beta}$ corresponding to a secondary driving current on the basis of a difference between a reference rotor angular frequency $w^*_n$ and a detected rotor angular frequency $w_n$ in order to obtain a reference torque;
  (c) slip frequency calculating means for calculating a primary supply voltage angular frequency $w_0$ on the basis of the primary curent $i_{1\beta}$, a primary reference current $i^*_{1\alpha}$ corresponding to a secondary magnetic flux, a detected rotor angular frequency $w_n$, and a ratio $\tau_2$ of a secondary inductance $L_2$ to a secondary resistance $r_2$;
  (d) decoupling calculating means for calculating a decoupling value to generate primary voltages $e_{1\alpha}$ and $e_{1\beta}$ in response to the primary reference current $i^*_{1\alpha}$ (constant secondary flux $\lambda_{2\alpha}$) and the primary current $i_{1\beta}$ (variable secondary current $i_{2\beta}$) in accordance with a first expression;
  (e) coordinate transforming means for transforming the calculated primary voltages $e_{1\alpha}$, $e_{1\beta}$ into a polar coordinate vector value in accordance with a second expression;
  (f) the digital PWMed pulse generator as set forth in claim 1 for generating a PWMed signal in response to the transformed polar coordinate value; and
  (g) inverter means for generating a motor driving current in response to the PWMed pulse.

* * * * *